(12) United States Patent
Daton-Lovett

(10) Patent No.: US 6,217,975 B1
(45) Date of Patent: Apr. 17, 2001

(54) EXTENDIBLE MEMBER

(75) Inventor: Andrew J. Daton-Lovett, London (GB)

(73) Assignee: Rolatube Technology Limited (GB)

( * ) Notice: Subject to any disclaimer, the term of this patent is extended or adjusted under 35 U.S.C. 154(b) by 0 days.

(21) Appl. No.: 09/155,011

(22) PCT Filed: Mar. 25, 1997

(86) PCT No.: PCT/GB97/00839

§ 371 Date: Sep. 15, 1998

§ 102(e) Date: Sep. 15, 1998

(87) PCT Pub. No.: WO97/35706

PCT Pub. Date: Oct. 2, 1997

(30) Foreign Application Priority Data

Mar. 25, 1996 (GB) .................................................... 9606200

(51) Int. Cl.[7] .............................. B32B 5/12; E04H 12/18; B27N 3/10

(52) U.S. Cl. ........................ 428/105; 428/34.5; 428/36.1; 428/107; 428/109; 428/113; 428/175; 428/188; 428/906; 264/257; 264/319; 156/161; 156/165; 52/108; 442/60; 442/218

(58) Field of Search ..................................... 428/174, 188, 428/34.5, 36.1, 105, 107, 109, 110, 113, 175, 906; 156/60, 161, 165, 174; 264/241, 257, 319; 52/108; 442/60, 218

(56) References Cited

U.S. PATENT DOCUMENTS

| | | |
|---|---|---|
| 3,144,104 | 8/1964 | Weir . |
| 3,144,215 | 8/1964 | Klein . |
| 3,177,987 | 4/1965 | Swain . |
| 3,357,457 | 12/1967 | Myer . |
| 3,360,894 | 1/1968 | Sharman . |
| 3,361,377 | 1/1968 | Trexler . |
| 3,387,414 | 6/1968 | Adams . |
| 3,434,674 | 3/1969 | Groskopfs . |
| 3,543,806 | 12/1970 | Rushing . |
| 3,608,844 | 9/1971 | Tumulty . |
| 3,696,568 | 10/1972 | Berry . |
| 3,811,633 | 5/1974 | Cummings . |
| 3,832,240 | 8/1974 | Kubo . |
| 4,225,871 | 9/1980 | Ramari . |
| 4,265,690 | 5/1981 | Lowenhar . |
| 4,991,784 | 2/1991 | Schmid . |

FOREIGN PATENT DOCUMENTS

| | | |
|---|---|---|
| 41 03 143 | 8/1992 | (DE) . |
| 43 02 214 | 7/1994 | (DE) . |
| 88/08620 | 11/1988 | (WO) . |
| 95/04561 | 2/1995 | (WO) . |

Primary Examiner—Donald J Loney
(74) Attorney, Agent, or Firm—Nixon & Vanderhye PC

(57) ABSTRACT

An extendible sheet member is configurable between first and second states. The first state is a coiled state (1.1) in which the member is coiled substantially parallel to a first axis and the second state is an extended state (1.2) in which the member extends substantially parallel to a second axis at some angle to the first axis. The member is made wholly or in part from a material or materials which give rise to internal stresses upon extension, these stresses acting at some angle to the second axis such as to bias the member to the second state. In many embodiments these stresses are produced by fibers which form part of the structure of said member. Said member is preferably reversibly configurable between said first and second states.

25 Claims, 3 Drawing Sheets

EXTENDIBLE MEMBER

This application is the national phase of international application PCT/GB97/00839 filed Mar. 25, 1997 which designated the U.S.

The present invention relates to an extendible member and a method of making an extendible member.

WO-A-88/08620 discloses an element which can be reversibly configured between a coiled state and an extended state. In one embodiment described therein, the element comprises a layer having a bias towards the extended state to which is attached a layer which undergoes plastic deformation during reconfiguration of the element. In another embodiment described therein, the element comprises a layer having a bias towards the extended state to which is attached a layer which has longitudinally extending fibres which give the second layer a bias towards the coiled state.

According to a first aspect of the present invention, there is provided an extendible sheet member which is configurable between first and second states, the first state being a coiled state in which the member is coiled substantially parallel to a first axis, the second state being an extended state in which the member extends substantially parallel to a second axis at some angle to the first axis, characterised by: the member being made, wholly or in part, from any material or materials which is/are stronger in tension and/or in compression at some angle to the first and/or second axes than in the direction of said axes, due to the geometric and/or molecular structure of said material or materials, such that, when the member is extended in a direction substantially parallel to the second axis, the disparity in tensile and/or compressive strength gives rise to a contraction in a direction at some angle to the second axis to bias the member to the second state.

This disparity may be derived, wholly or in part, from the presence of fibres in the structure of the member, where such fibres form part of the member. Thus, the element may comprise fibres forming part of the member and which are arranged to give rise to said disparity in tensile and/or compressive strength at some angle to the first and/or second axes compared to the tensile and/or compressive strength in the direction of said axis.

According to a second aspect of the present invention, there is provided an extendible sheet member which is configurable between first and second states, the first state being a coiled state in which the member is coiled substantially parallel to a first axis, the second state being an extended state in which the member extends substantially parallel to a second axis at some angle to the first axis, the member having a plurality of crossed fibres in or parallel to the plane of the sheet, characterised by: each fibre being at an angle between 0 degrees and 90 degrees to the first axis, such that, when the member is extended in a direction substantially parallel to the second axis, said crossed fibres give rise to a contraction in a direction at some angle to the second axis to bias the member to the second state.

Said fibres are preferably resilient.

Said fibres may be provided on one side of a substrate. Alternatively, said fibres may be provided on both of opposite sides of a substrate.

Said fibres may be embedded in a substrate.

It is preferred that said substrate be resilient.

At least some of said fibres may be knitted, woven, and/or provided as a series of laminae.

Groups of said fibres may be at different respective angles to the first axis.

Said fibres can be at varying angles to the first axis, said angles varying across and along the member.

The member may have fibres across selected portions only of the member, other portions of said member being free of fibres.

The transition to the second state may be caused, wholly or in part, by the presence of tubular channels within the material from which the member is formed, said channels running substantially parallel to the plane of the member at some angle to the second axis.

Said member is preferably reversibly configurable between said first and second states.

In some cases, it may be advantageous to provide means for releasably locking opposite edges of the member together when said member is in the second state. Such means may be for example, a clip, interlocking teeth, a zip, etc. The opposite edges may alternatively be permanently fixed together, for example by welding or by adhesives.

According to a third aspect of the present invention, there is provided a method of manufacturing an extendible sheet member which is configurable between first and second states, the first state being a coiled state in which the member is coiled substantially parallel to a first axis, the second state being an extended state in which the member extends substantially parallel to a second axis at some angle to the first axis, the member having a plurality of crossed fibres in or parallel to the plane of the sheet, each fibre being at an angle between 0 degrees and 90 degrees to the first axis, such that, when the member is extended in a direction substantially parallel to the second axis, said crossed fibres give rise to a contraction in a direction at some angle to the second axis to bias the member to the second state, said method comprising the steps of:

passing a first layer which provides a substrate and a second layer comprising said fibres over heating means to heat said first layer thereby to bond said first and second layers together; and, subsequently applying pressure to said bonded first and second layers to produce said member in its coiled state.

More than two layers may be passed over the heating means to be bonded together and pressure subsequently applied to said bonded layers.

According to a fourth aspect of the present invention, there is provided a method of manufacturing an extendible sheet member which is configurable between first and second states, the first state being a coiled state in which the member is coiled substantially parallel to a first axis, the second state being an extended state in which the member extends substantially parallel to a second axis at some angle to the first axis, the member having a plurality of crossed fibres in or parallel to the plane of the sheet, each fibre being at an angle between 0 degrees and 90 degrees to the first axis, such that, when the member is extended in a direction substantially parallel to the second axis, said crossed fibres give rise to a contraction in a direction at some angle to the second axis to bias the member to the second state, said method comprising the steps of:

Applying heat and/or pressure to a layer which provides a substrate and which has said fibres embedded therein to produce said member in its coiled state.

An embodiment of the present invention will now be described by way of example with reference to the accompanying drawings, in which.

Figure 1:
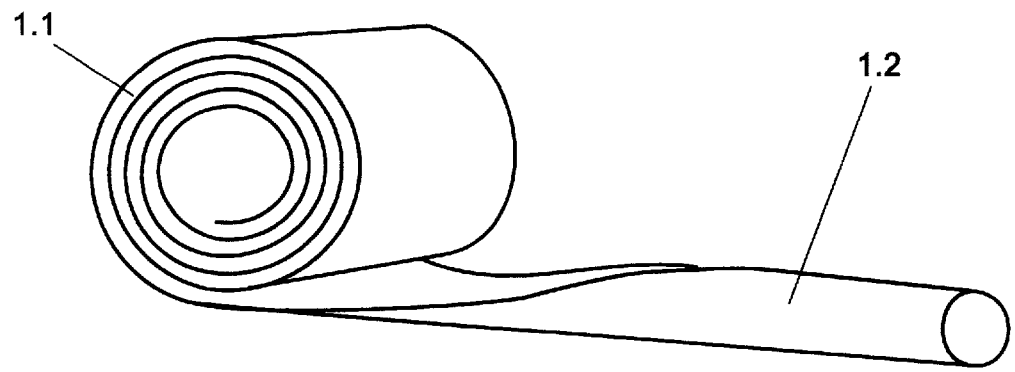
FIG. 1 is a perspective view of an example of a member of the present invention.

In an embodiment, the present invention takes the form of a ribbon of resilient material, curved to extend beyond its point of origin, forming a spiral or coil, which, when uncoiled, curves in a second direction as a result of internal stresses within the material of which the ribbon is made, said stresses being produced, wholly or in part, by the act of extension. Said second curved form may be an arc section, tubular section or any compound curved section. Said second curved form can be either temporary, that is dependent upon the ribbon being restrained in an uncoiled form by external means, or a second stable shape or form of said ribbon, which will not return to its original coiled or spiral form without the application of an external force. FIG. 1 shows one example of such a device in which a coil 1.1 extends to form a tube 1.2. The coil 1.1 has its outer free end flattened and pulled away from the body of the coil whereupon it forms spontaneously into a tube 1.2.

There are many areas of engineering practice where it is desirable to be able to extend and then retract a member to form a linear actuator, or to compact a curved or hollow member for purposes of transportation or storage, or where such a member—for example a water pipe or electrical conduit—is supplied in the form of short lengths which are joined at the point of use. This invention provides an alternative to conventional means such as telescopic or jointed systems which can achieve the same effect. It can also be utilised for the production of devices such as conveyor belts which can be substantially self supporting when in the uncoiled form but which can be returned to the coiled form to allow passage over rollers to return the belt back along its travel.

In an embodiment, the invention depends upon fibres forming part of the material from which it is formed acting to force the ribbon into the second curved form as described below.

Figure 2A:
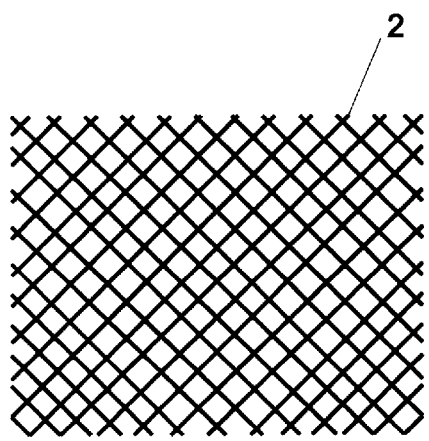
FIGS. 2A and 2B illustrate the principles of the present invention.
Figure 2B:
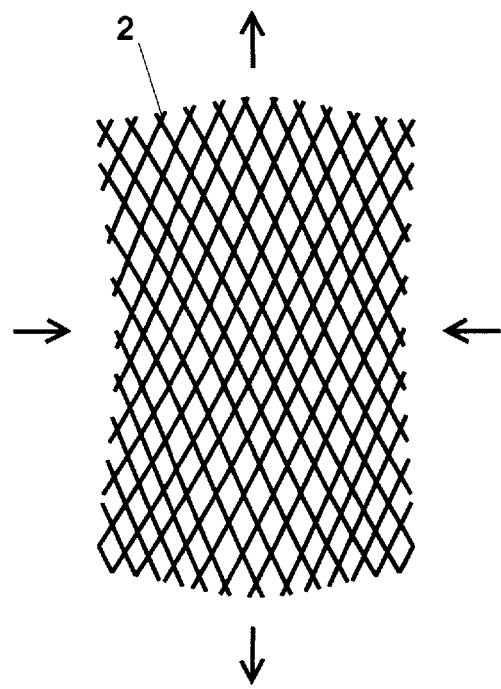

It is known that if a piece of woven or knitted fabric 2, as shown in FIG. 2A, is stretched along a direction at some angle to the direction of its weave, it will contract in the direction normal to said stretch as shown in FIG. 2B. Thus one embodiment of the invention could be made by coating a coiled piece of resilient substrate with such a fabric, on one or both sides of its surface, such that when uncoiled the fabric on the inside face will be stretched, causing a contraction in the direction normal to that of the uncoiling action. This contraction will force the resilient member to curve in this direction, that is normal to the original curvature. At the same time, the fabric on the outer face will tend to be compressed along the original axis of curvature and, if the member is forced towards the second curvature, will then act to give a force tending to counter said original curvature.

If such fibres are embedded within a matrix to form a fibre-reinforced composite, the same effect appears without the need for an underlying resilient substrate, the composite forming a member in its own right, and allowing the fibres to be in the form of a woven or knitted material, as described above, or to be laid as a series of laminae, with the matrix acting to hold them together to form a unitary element. In such a composite member, the forces in layers on the concave side of the neutral axis of bending will act as described above, being stressed in tension and giving rise to a tensile force forming the second curvature; however, fibres lying on the convex side of the neutral axis of bending will be compressed as previously described and, due to their inability to buckle within the matrix, will act to force the member towards its second curve and to straighten the original curved form immediately, rather than only acting as a result of the commencement of the second curvature. Such a device can thus be composed of a woven, knitted or laminar composite, with fibres laid in a minimum of two directions at angles to the direction of the natural curvature of the coil. Further layers can be added, either of a similar nature or of a resilient material which does not possess the tendency to naturally form into a second curve, but which can be forced to do so as a result of the action of the angled fibre layers.

Depending on the angle to the axis of curvature and the elasticity of the fibres in the layer or layers forcing the member into the second form, the resilience of any other layer that may be included in the member and the elasticity of the matrix material in which the fibres are embedded, if such a matrix is used, the second form will be either temporary, maintaining its shape only whilst some external restraint is applied to straighten the original curvature, or may form a completely stable second form which will not return to its original curve until an external force is applied to straighten the second curve, allowing the original form to re-establish itself.

This effect arises as a result of the tensile and or compressive modulus of the fibres being higher or lower than that of the matrix in which they are embedded, and will not appear if the matrix and fibres are of the same tensile and/or compressive modulus. If considered as a single material, the effect can be considered as a result of the tensile and/or compressive strength of the material being lower in the axes around which the coil is formed and/or along which the member is extended than in the directions at some angle to these axes, which are the directions in which the fibres are laid in the embodiments utilising a resilient member coated in such fibres or made from a fibre-reinforced composite material. An embodiment of the present invention could thus be formed from any material displaying these characteristics either as a result of the geometric structure of the material, as in a fibre-reinforced composite, or as a result of the molecular structure of the material.

A further example of a material the geometric structure of which would give rise to this effect would be a resilient member in which a series of hollow tubular channels run through the substance of the member in the same directions as the fibres described in the embodiment utilising a fibre-reinforced composite. The channels may be allowed to be open to the external environment, filled with gases or fluids, or evacuated. For the purposes of this document, the resultant material can be considered as equivalent to a material containing fibres of lower tensile or compressive modulus than the matrix.

All arguments relating to the design of the extendible members described herein should be considered as applying also to the use of materials which exhibit the effect described above as a result of their molecular or geometric structure, where such materials form all or part of the structure of such an extendible member.

The effects of fibres, the molecular structure of a material or materials, and other geometric structures such as, for example, the presence of tubular channels, may be combined within any single device in any combination which may prove suitable for any given purpose.

The effect can perhaps be most clearly understood if the material producing the effect is considered as containing a large number of scissor-like linkages in the manner of a pantograph extending in two directions. Thus it will be seen that if a sheet of such linkages is extended in one direction it will contract in the direction normal to said extension, and if compressed in one direction it will expand in the direction normal to said compression.

In many circumstances it may be desirable to provide for some means to join the edges of such a member to each other temporarily, to increase the strength of the member whilst in use. This may be achieved, for example, by means of some form of clip, interlocking tooth, zip or other means.

In other circumstances it may be desirable to permanently join the edges of the member after extension. This may be achieved, for example, by means of welding, adhesives or other means to provide a closed, sealed hollow structure.

Figure 3A:
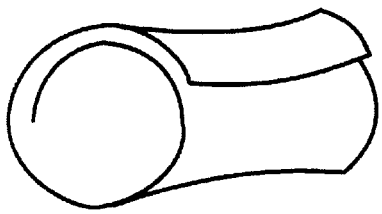
FIGS. 3 to 6 show further examples of the present invention.
Figure 3B:
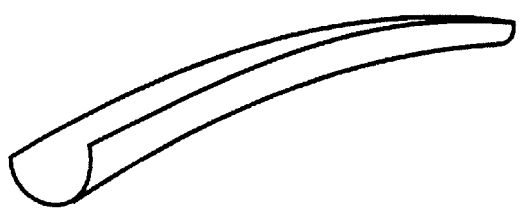

If the coil or spiral which forms the original shape is flat in cross section, then the second form will usually be straightened along the original direction of curvature to form a member which is a straight arc section, compound section, or tubular or other hollow section. If however the original coil or spiral is formed with a curvature such that one or both edges are longer than the centre section of the coil or spiral as shown, for example, in FIG. 3A, the member will adopt a second form which is a curve along the original axis of curvature with the longer edge or edges forming the outside of said curve as shown in FIG. 3B.

Figure 4A:
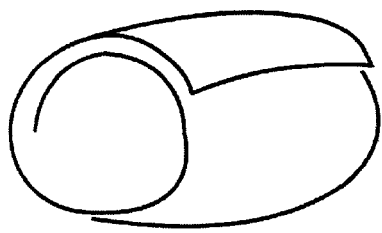
Figure 4B:

If the original coil or spiral is formed such that the centre section is longer than the edges as shown in FIG. 4A, the member will adopt a second form which is a curve along the original axis of curvature with the edges forming the inside of said curve as shown in FIG. 4B.

In general, if the member is formed into any first form in which there are differences in the diameter of the coil along its axis, the resultant second form will exhibit curvatures of this nature.

If the original form of the member is a constant curve, and the angles of the fibres within the layer or layers acting to form the second curve remain the same along its length, the second form will be of a constant radius and cross section. If desired, the radius and cross section of the second form may be varied along the length by adjusting either the angles of the fibres in the layers acting to form the second curve or by varying the radius of curvature of the original coil or spiral along its length.

Figure 5:
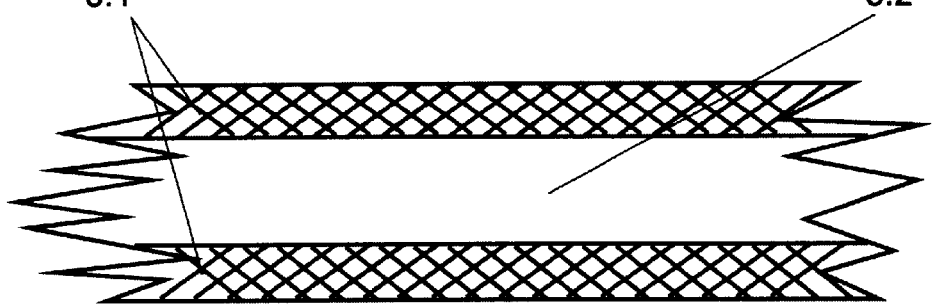
Figure 6:

Compound curves can be produced by varying the angles of the fibres within the layer or layers producing the second curve, or by including such fibres only in some areas of the formed ribbon. Thus, as shown by way of example in FIG. 5, the use of such fibres in a resilient member in strips 5.1 along both edges of a resilient member, with an area between 5.2 formed of a resilient material which has no tendency to form a second curve, will cause the ribbon to form a second compound curve of the cross section shown in FIG. 6.

An almost infinite variety of such compound and variable second curvatures can be formed by applying these general principles.

A preferred embodiment of this invention and a means of production thereof is described below.

Any material of suitable mechanical characteristics can be used to form the matrix; epoxy, polyester, phenolic and urethane matrices which can be either catalytically or thermally set are probably the most common composite matrix materials although even metal matrices could be utilised. Experimental data to date has indicated that the best results are obtained from thermoplastic matrix materials in combination with a range of reinforcing fibres which include glass, aramid, polyesters, carbon fibres, metal fibres, high density polyethylene fibres and liquid crystal polymers. The thermoplastic matrix materials which have shown good results include polypropylene, PET, PES, PEEK, polyamides, polyethylenes, ABS and thermoplastic urethanes. It should be noted that materials such as high density polyethylene fibres in a polyethylene matrix, and liquid crystal polymers within matrices of the same polymer, should be regarded as fibre reinforced composites for the purposes of manufacturing the devices described herein, as although of uniform chemical composition, they are mechanically similar to any fibre reinforced composite of the more orthodox type in which the matrix and reinforcement are of a substantially different nature.

Although there is no reason why the range of devices described herein could not be manufactured in a single process from separate fibre and thermoplastic materials, a number of products are commercially available in which the matrix and reinforcement are combined in a material suitable for processing by the application of heat and pressure to form the device. In general these come in three types. The first are woven, knitted or braided materials in which the thermoplastic is incorporated as a thread co-mingled with the reinforcement, included in the weave as a separate fibre, or coated onto the surface of the reinforcing fibre. The best known of these is marketed by Vetretex Ltd. in the form of woven cloth and co-mingled thread under the trade name Twintex. The second are materials also formed from co-mingled threads or by inclusion of separate fibres or coated fibres but in which the fibres are laid as flat laminae, which are then held together by lines of stitching or knitting to form a unitary multi-layered material in which the fibre orientation and the number of layers can be specified for a given purpose. Materials of this type are also produced by Vetretex and by Tech Textiles Ltd, a division of Turner Newall. The third class of materials consist of pulltruded unidirectionally reinforced tapes in which the fibre is preconsolidated into the matrix. These tapes can then be cut and assembled to form any desired internal structure before being heated under pressure to re-melt the matrix, thus forming the finished component.

Materials of this type are produced by Borealis Ltd, a subsidiary of Statoil Ltd, under the trade name Plytron and by Baycomp Ltd in a wide variety of matrices and reinforcements.

In general the best results at radii of curvature for the extended device of above 25 mm have been achieved using pulltruded, pre-consolidated tapes. Below this radius, woven, knitted or braided materials tend to produce better results as the internal stresses of the transition between forms are lower.

Where desirable, any combination of one or more of the above materials may be utilised in production. Where desirable, more than one matrix may be used in the same device provided adhesion can be assured.

Figure 7:
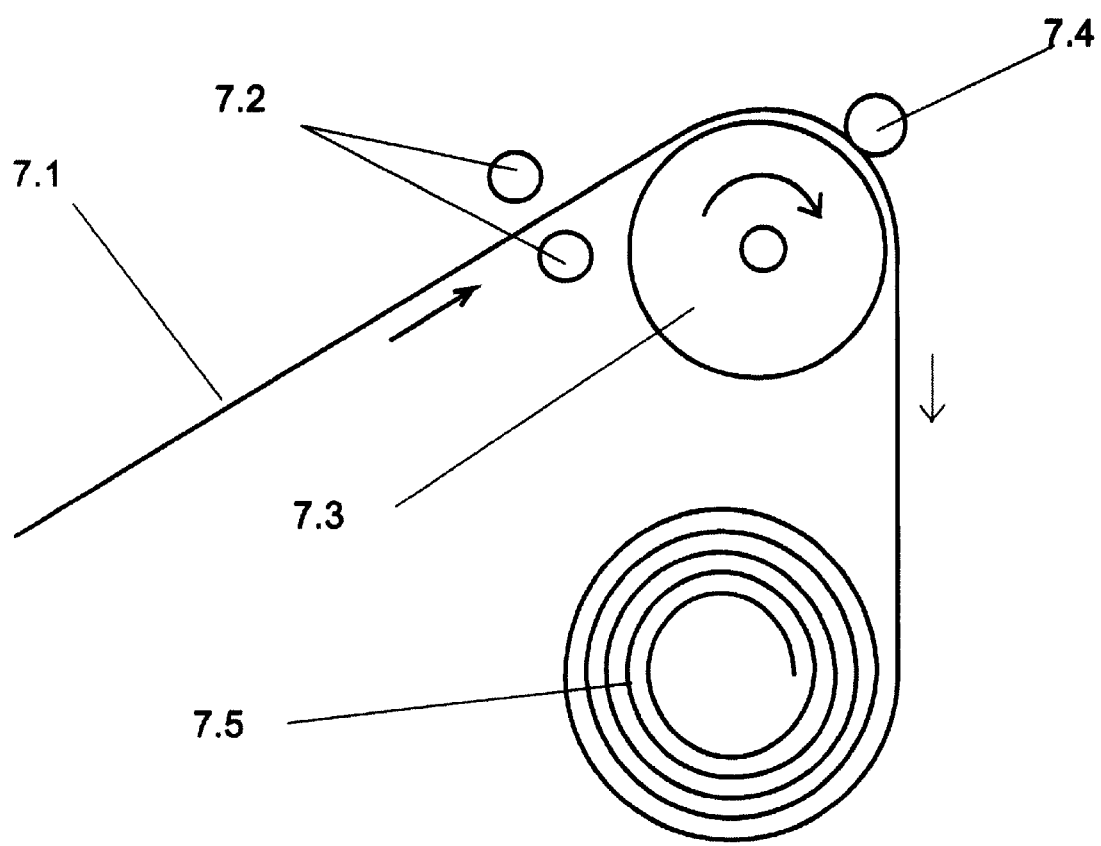
FIG. 7 is a diagrammatic side view of an example of apparatus for manufacturing the member of the present invention.

FIG. 7 shows one or more ribbons 7.1 of material of the type described above, or layers of both reinforcing material and of thermoplastic suitable for use as a matrix, with the angles of the reinforcement such that they will produce the desired secondary curvature. A typical lay might consist of five layers of pulltruded tape laid at, for example, angles to the axis of the forming roller 7.3 of plus fifty five degrees, minus fifty five degrees, ninety degrees, plus fifty five degrees and minus fifty five degrees. These are heated to the melting point of the matrix material by being transported past a heat source 7.2 and then passed over a cool roller 7.3 of the diameter and form needed to produce the desired coil or spiral whilst pressure is applied by a roller 7.4 to produce a continuous ribbon 7.5 which can be allowed to accumulate as a coil for as long as may be desired. This type of process may be continuous, as illustrated, or intermittent, with the material being advanced and melted in steps and then pressed onto the former by a die forming the outer surface, this process being repeated once the melted material has cooled. Use may also be made of means of melting the material ultrasonically. When using pre-consolidated feedstock, this can have the advantage that no surface melting need take place, allowing the forming roller and die to be run at lower temperatures than would be the case if the material were melted on the surface, thus increasing the speed of throughput.

When using pre-consolidated materials, it is not necessary for the matrix to be completely melted. All that is required is that a high integrity weld is formed between the layers to set the curvature into the finished coil. This may be accomplished ultrasonically, or by passing the individual ribbons of material at such a speed past a number of heat sources that their surfaces only are melted, after which they are pressed together by means of rollers or a forming die until sufficiently cooled to be wound off onto the accumulating coil of finished product. This may be carried out continuously or intermittently as previously described. In many cases it may be desirable to include a thin film of thermoplastic, either of the same material as the matrix or of some other material which will bond with the matrix. The advantages of this weld processing lie in greater speed of production and reduced energy costs. The same result may be achieved by any means other than welding which can bond the pre-consolidated layers with sufficient integrity.

It should be noted that some lays, particularly those consisting largely or entirely of laminar reinforcements, will display a tendency to form into a coil which will offset at an angle when wound and display a rotation along the axis when extended. This can be countered either by making the angles of the reinforcement non symmetrical about the forming axis, or by passing the feedstock at an angle to the forming axis which is the same as the angle of offset but in the opposite direction. This will then produce a finished product which will roll along the forming axis, and extend normal to said forming axis.

Among the many uses to which this technology could be put are cable conduits, water pipes, sewage pipes, drainage and irrigation pipes, drill bore linings for petroleum or gas or water wells, extendible handles and probes, retractable awnings or vehicle hoods, roll up ladders, actuators, aerial masts, camera mounts, microphone booms, lighting supports, conveyor belts, telecommunications or computer cable ducting, tent poles, temporary curved structures, surveyors poles and other measuring devices, stretchers and many others.

What is claimed is:

1. An extendible sheet member which is selectively configurable in at least one of a first state and a second state the first state being a coiled state in which the member is coiled about a first axis, the second state being an extended state in which the member extends substantially parallel to a second axis disposed at an angle to the first axis, the member being made at least in part, from at least one material which is stronger in at least one of tension and compression at an angle between 0° and 90° with respect to the first and second axes than in the direction of said axes, due to at least one of a geometric and a molecular structure of said at least one material, whereby, when the member is extended in a direction substantially parallel to the second axis, the difference in at least one of tensile and compressive strength causes a contraction force in a direction at an angle to the second axis that biases the member to said second state.

2. An extendible member according to claim 1, comprising fibres forming part of the member and arranged to cause said difference in at least one of tensile and compressive strength.

3. An extendible sheet member which is selectively configurable in at least one of a first state and a second state the first state being a coiled state in which the member is coiled about a first axis, the second state being an extended state in which the member extends substantially parallel to a second axis at an angle to the first axis, the member having a plurality of crossed fibres one of in and parallel to a plane of the sheet member, each fibre being at an angle between 0 degrees and 90 degrees to the first axis and the second axis, whereby, when the member is extended in a direction substantially parallel to the second axis, said crossed fibres give rise to a contraction force in a direction at an angle to the second axis thereby to bias the member to the second state.

4. An extendible member according to claim 2 or claim 3, wherein said fibres are resilient.

5. An extendible member according to claim 2, wherein said fibres are provided on one side of a substrate.

6. An extendible member according to claim 2, wherein said fibres are provided on both of opposite sides of a substrate.

7. An extendible member according to claim 2, wherein said fibres are embedded in a substrate.

8. An extendible member according to any of claims 5 to 7, wherein said substrate is resilient.

9. An extendible member according to claim 2 or claim 3, wherein at least some of said fibres are knitted.

10. An extendible member according to claim 2 or claim 3, wherein at least some of said fibres are woven.

11. An extendible member according to claim 2 or claim 3, wherein at least some of said fibres are a series of laminae.

12. An extendible member according to claim 2 or claim 3, wherein groups of said fibres are at different respective angles to the first axis.

13. An extendible member according to claim 2 or claim 3, wherein said fibres are at varying angles to the first axis, said angles varying across and along the member.

14. An extendible member according to claim 2 or claim 3, wherein the member has fibres across selected portions only of the member, other portions of said member being free of fibres.

15. An extendible member according to claim 1, wherein the transition to the second state is caused, wholly or in part, by the presence of tubular channels within the material from which the member is formed, said channels running substantially parallel to the plane of the member at some angle to the second axis.

16. An extendible member according to claim 1, said member being reversibly configurable between said first and second states.

17. An extendible member according to claim 1, comprising means for releasably locking opposite edges of the member together when said member is in the second state.

18. An extendible member according to claim 1, wherein the material is such that the member is stronger in at least one of tension and compression at an angle to the first axis than in the direction of the first axis and is stronger in at least one of tension and compression at an angle to the second axis than in the direction of the second axis such that when in the first state the member is biased to said first state and when in the second state the member is biased to said second state and such that each of the first and second states is a stable state requiring the application of an external force to configure the member from the first state to the second state and the application of an external force to configure the member from the second state to the first state.

19. An extendible member according to claim 3, wherein the fibres are such that the member is stronger in at least one of tension and compression at an angle to the first axis than in the direction of the first axis and is stronger in at least one of tension and compression at an angle to the second axis than in the direction of the second axis such that when in the first state the member is biased to said first state and when in the second state the member is biased to said second state and such that each of the first and second states is a stable state requiring the application of an external force to configure the member from the first state to the second state and the application of an external force to configure the member from the second state to the first state.

20. An extendible member according to claim 3, wherein said fibres are provided on one side of a substrate.

21. An extendible member according to claim 3, wherein said fibres are provided on both of opposite sides of a substrate.

22. An extendible member according to claim 3, wherein said fibres are embedded in a substrate.

23. A method of manufacturing an extendible sheet member which is selectively configurable in at least one of a first state and a second state the first state being a coiled state in which the member is coiled about a first axis, the second state being an extended state in which the member extends substantially parallel to a second axis disposed at an angle to the first axis, the member having a plurality of crossed fibres in or parallel to the plane of the sheet member, each fibre being at an angle between 0 degrees and 90 degrees to the first axis and the second axis, whereby, when the member is extended in a direction substantially parallel to the second axis, said crossed fibres give rise to a contraction at an angle to the second axis thereby to provide a biasing force to bias the member to the second state, said method comprising the steps of:

passing a first layer which provides a substrate and a second layer comprising said fibres over heating means to heat said first layer thereby to bond said first and second layers together; and subsequently applying pressure to said bonded first and second layers to produce said member in its first, coiled state.

24. A method according to claim 23, wherein more than two layers are passed over the heating means to be bonded together and pressure subsequently applied to said bonded layers.

25. A method of manufacturing an extendible sheet member which is selectively configurable in at least one of a first state and a second state the first state being a coiled state in which the member is coiled about a first axis, the second state being an extended state in which the member extends substantially parallel to a second axis at an angle to the first axis, the member having a plurality of crossed fibres one of in and parallel to a plane of the sheet, each fibre being at an angle of between 0 degrees and 90 degrees to the first axis and the second axis, whereby, when the member is extended in a direction substantially parallel to the second axis, said crossed fibres give rise to a contraction force at an angle to the second axis thereby to bias the member to the second state, said method comprising the steps of:

applying at least one of heat and pressure to a layer which provides a substrate and which has said fibres embedded therein to produce said member in its first, coiled state.

\* \* \* \* \*